Oct. 31, 1961  R. J. HARKE  3,006,098
FISHING ROD HANDLE WITH RELEASABLE REEL
AND ROD CLAMPING MECHANISM
Filed Dec. 8, 1958  2 Sheets-Sheet 1
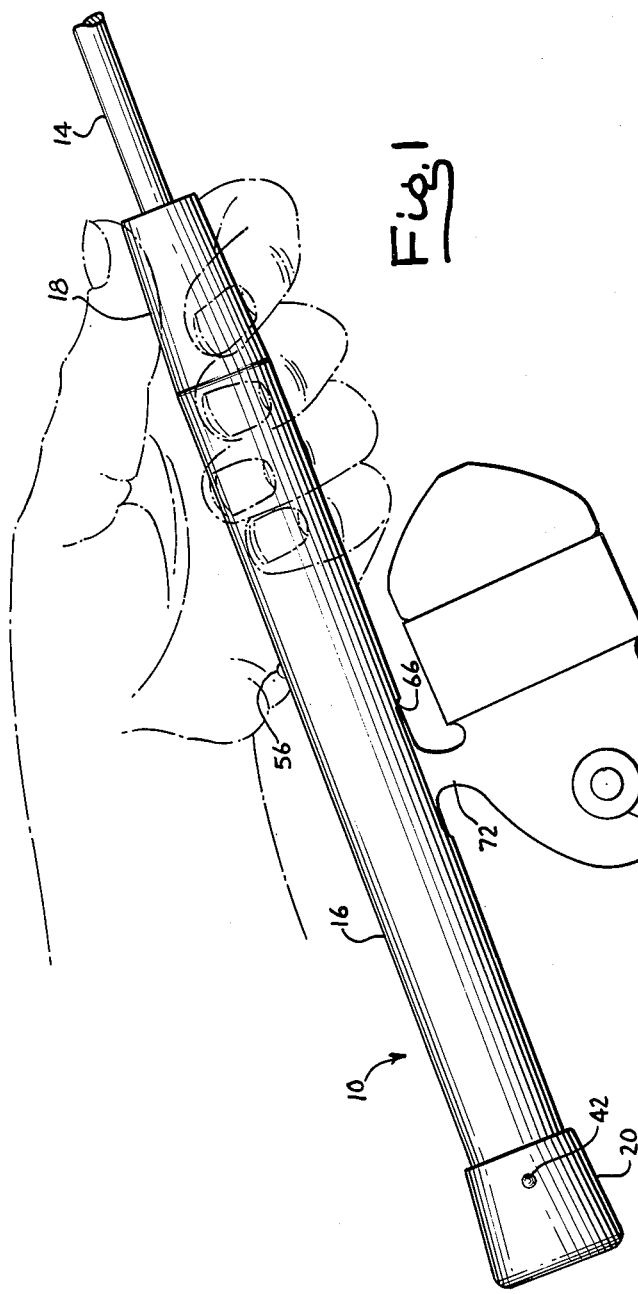
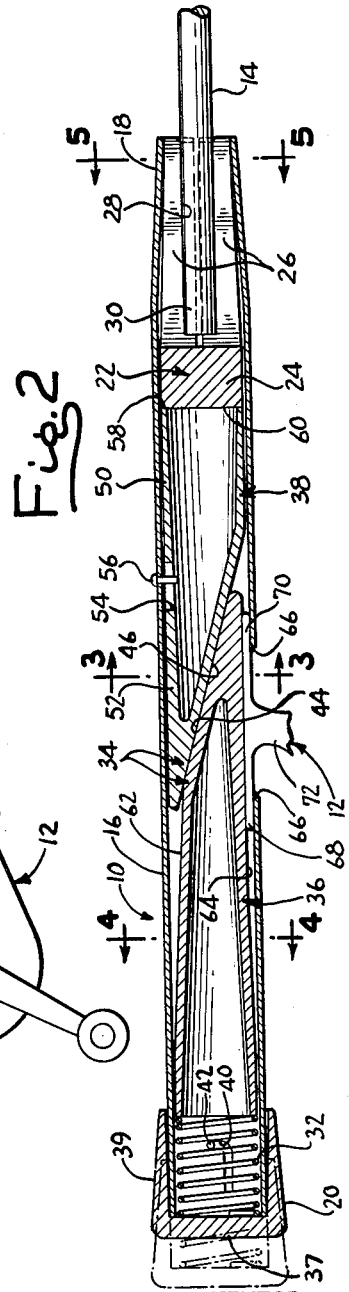
INVENTOR.
RAYMOND J. HARKE
BY
ATTY.

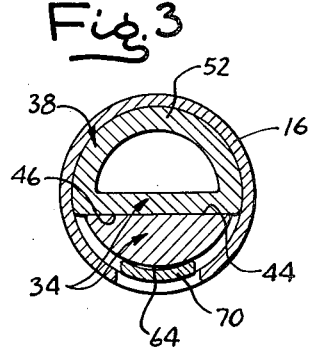
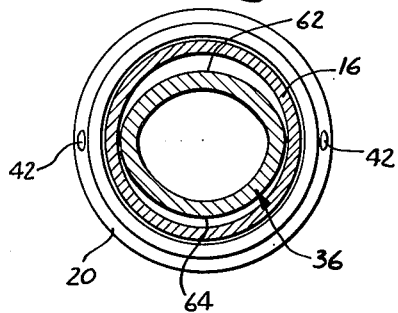
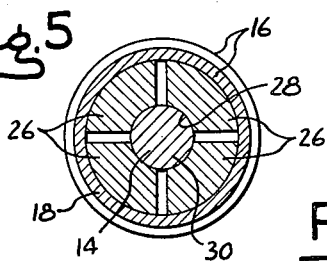
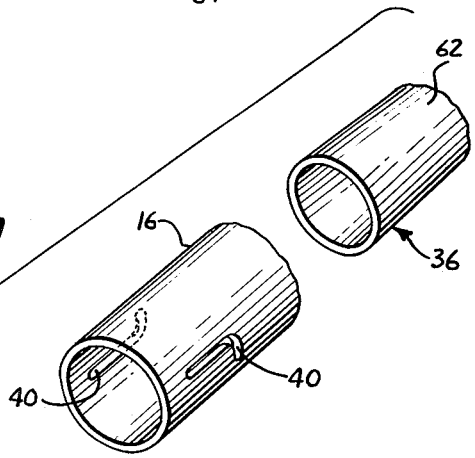
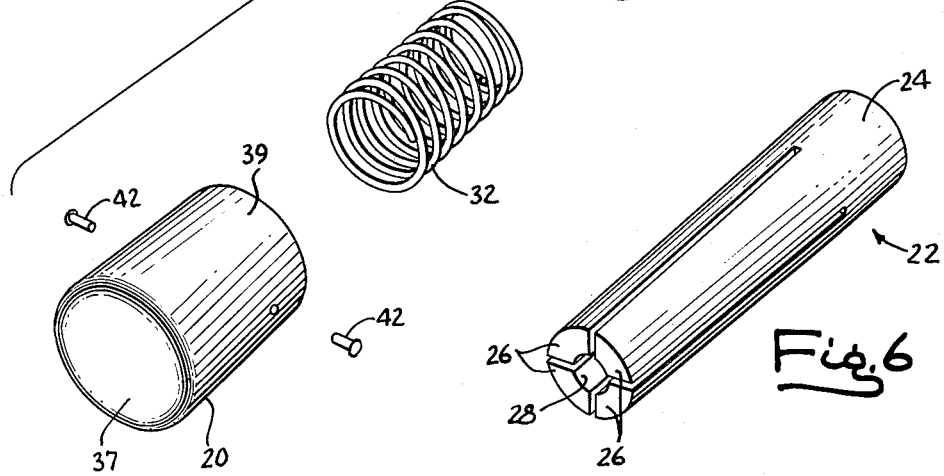

United States Patent Office 3,006,098
Patented Oct. 31, 1961

3,006,098
FISHING ROD HANDLE WITH RELEASABLE
REEL AND ROD CLAMPING MECHANISM
Raymond J. Harke, 5505 W. Potomac Ave., Chicago, Ill.
Filed Dec. 8, 1958, Ser. No. 778,996
11 Claims. (Cl. 43—22)

The present invention relates to fishing rods and has particular reference to an improved fishing rod handle having associated therewith novel means for detachably clamping a spinning or other type of reel thereto in an operative position, as well as novel means for releasably clamping the butt end of a fishing rod in operative position to the handle. The reel-clamping means may be employed solely for detachably securing a reel in operative position on a fishing rod handle, and the rod-clamping means may likewise be employed solely for detachably securing the butt end of a fishing rod to the rod handle. However, according to the form of the invention illustrated herein, the reel-clamping means and the rod-clamping means cooperate, each with the other, in such a manner that by manipulation of a single operating member, the two clamping mechanisms may be applied simultaneously to securely lock both the reel and rod in position on the handle, or released simultaneously to unlock the reel and rod and thus permit their removal.

Insofar as the reel clamping mechanism of the present invention is concerned, it has heretofore been the practice in one instance releasably to secure the reel on the fishing rod handle by means of one or more sliding bands which frictionally engage over oppositely directed reel bracket fingers of tangs in a well-known manner. This type of clamping device is possessed of numerous limitations, principal among which is the tendency of the sliding band or bands to work loose during operation of the reel due to vibration, line tension, etc. Furthermore, the use of such sliding bands presents an obstruction to free grasping of the handle in that both the bands and the reel bracket fingers are disposed on the outside of the handle proper and present protuberances which are uncomfortable or otherwise interfere with the user's normal grasp of the handle.

The present invention is designed to overcome the above-noted limitations that are attendant upon the construction and use of conventional sliding band types of reel-attachment means for fishing rod handles and, toward this end, it contemplates the provision of a reel-clamping means whereby the reel, when in its operative position on the fishing rod handle, merges by way of the attachment bracket gradually into the generally cylindrical confines of the handle and presents no sharp or abrupt protuberances which interfere with the hand or fingers of the user. When in its operative position on the fishing rod handle, the reel attachment bracket fingers are substantially wholly enclosed by the handle and are thus in an out-of-the-way concealed position. Furthermore, according to the present invention, the clamping means for the reel bracket fingers are entirely enclosed within the handle body and manipulation thereof is effected by means of a handle end cap having a bayonet connection with the handle proper and which, therefore, is beyond the portion of the handle which normally is grasped when the fishing rod is being used so that it in no way interferes with casting operations or other handling of the fishing rod assembly.

Insofar as the rod clamping mechanism of the present invention is concerned, conventional clamping devices include the use of set screws, snap rings, screwthreads and a wide variety of mechanical devices which either present obstructions or protuberances which destroy the normal smooth overall contour of the handle and which occasionally require somewhat extensive manipulation for their application or release. Furthermore, such devices frequently require special tooling or modification of the butt end of the fishing rod proper so that proper cooperation thereof with the clamping means may be attained.

The present invention is also designed to overcome the above-noted limitations that are attendant upon the use of conventional rod-clamping devices and, toward this end, it further contemplates the provision of a novel chuck mechanism for securely and releasably clamping the butt end of the fishing rod proper in position on the handle. According to the present invention, constriction of the chuck fingers about the butt end of the rod and release thereof is effected by manipulation of a handle end cap having a bayonet connection with the handle proper and which is similar or identical to the end cap mentioned above for manipulating the reel-clamping mechanism and which, when the fishing rod handle is equipped with both the reel-clamping and rod-clamping mechanisms of the present invention, is the same end cap that is employed for reel-clamping purposes.

It is among the principal objects of the invention therefore first to provide a novel form of reel attachment means for a fishing rod handle which, for reasons briefly outlined above, is an improvement over conventional reel attachment means; secondly, to provide a novel form of rod attachment means for such a handle which, likewise for reasons set forth, is an improvement over conventional rod attachment means; and thirdly, to provide a fishing rod handle which incorporates both the reel and the rod attachment means, both means being operable under the control of a single manipulating member.

Another and important object of the invention is to provide a fishing rod handle of the character set forth above which is circular in transverse cross section throughout and which may be constructed or designed along the generally accepted tapered contour associated with most conventional fishing rod handles and wherein neither the reel attachment means nor the rod attachment means presents to the overall handle configuration any offsets, protuberances or other surface irregularities tending to destroy the smooth generally tapered cylindrical contour of the handle.

Another and similar object of the invention is to provide a fishing rod handle of this character wherein all of the operative reel attachment or clamping means and all of the operative rod attachment or clamping means are contained wholly within the generally tapered cylindrical confines of the fishing rod handle casing or shell so that the handle presents no protruding parts.

Yet another object of the invention is to provide such a fishing rod handle wherein the reel clamping means and the rod clamping means cannot and will not work loose under the influence of vibration, shock, impact, or other motion of the handle incident to use of the reel of the rod.

A still further object of the invention, in a fishing rod handle of this character, is to provide a reel and rod-clamping means wherein an extremely powerful clamping force is applied to both the reel-supporting bracket and the butt end of the fishing rod proper to maintain these members in their respective assembled positions on the fishing rod handle and wherein both clamping forces are maintained effective under the control of a single locking means which, until voluntarily loosened or released, maintains full clamping pressure on both the reel supporting bracket and butt end of the rod.

The provision of a fishing rod handle which is simple in its construction and which therefore may be manufactured at a low cost; one which is comprised of a minimum number of parts, particularly moving parts, and which therefore is unlikely to get out of order; one which is capable of ease of assembly and disassembly for purposes of inspection, replacement of parts or repair; one which is rugged and durable and which therefore may be subjected to rough usage; one which, when assembled, has the internal parts thereof sealed against or shielded from exposure to moisture, dust or dirt; one which is capable of ease of manipulation to effect the desired clamping action and release thereof, with gloved hand if necessary; one which is attractive in its appearance and pleasing in its design; and one which otherwise is well adapted to perform the services required of it, are further desirable features which have been borne in mind in the production and development of the present invention.

Other objects and advantages of the invention, not at this time enumerated, will become more readily apparent as the nature of the invention is better understood.

In the accompanying two sheets of drawings forming a part of this specification a preferred embodiment of the invention has been shown.

In these drawings:

FIG. 1 is a fragmentary perspective view of a fishing rod handle constructed in accordance with the principles of the present invention and showing the same in an operative position of use with a reel operatively applied thereto;

FIG. 2 is a longitudinal sectional view taken substantially centrally through the fishing rod handle of FIG. 1 and showing fragmentary portions of a reel and of a rod operatively applied thereto;

FIG. 3 is a sectional view taken substantially along the line 3—3 of FIG. 2;

FIG. 4 is a sectional view taken substantially along the line 4—4 of FIG. 2;

FIG. 5 is a sectional view taken substantially along the line 5—5 of FIG. 2;

FIG. 6 is a perspective view of a collet core employed in connection with the present invention; and FIG. 7 is a fragmentary exploded perspective view of the proximate end region of the fishing rod handle.

Referring now to the drawings in detail and in particular to FIGS. 1 and 2, a fishing rod handle of preferred form is designated in its entirety at 10 and has associated therewith clamping means whereby a reel of any suitable type, as, for example, a spinning reel 12, may releasably be applied thereto in the usual offset position at one side of the handle where it is conveniently accessible for manipulation. The handle 10 also has associated therewith at the distal end thereof releasable clamping means for operatively retaining the butt end of a flexible fishing rod proper 14 in proper axially aligned position relative to the handle. These clamping means for the reel 12 and rod 14, and the manner in which they may be caused to cooperate, each with the other, under the control of a single manipulating member, in essence, constitute the present invention.

The handle 10 involves in its general organization an elongated tubular outer shell or casing 16 which is cylindrical throughout a major portion of its axial extent but which tapers slightly at its forward or distal end as indicated at 18. The casing 16 may be formed of any suitable metal, as, for example, aluminum alloy which possesses the necessary strength and lightness to render it suitable as a fishing rod handle, and it may, if desired, be appropriately covered with a suitable grip (not shown) of leather, cork or the like. The handle casing 16 is of open-ended construction and the rear or proximate end thereof is adapted to be closed by a cup-shaped closure cap 20 which is telescopically received over the casing and which, in addition to constituting a closure member for the proximate end of the casing, also constitutes an operating member whereby the reel and rod-clamping means may selectively be simultaneously engaged and disengaged in a manner that will be made clear presently.

Slidably disposed within the tapered distal region of the handle casing 16 is a rod-retaining collet type chuck 22 (see FIG. 6) which is of integral one-piece construction and which includes a solid base section 24 from which there extends forwardly a series of four chuck fingers 26, the fingers extending in substantial parallelism and defining therebetween an axial two-way split bore 28 designed for telescopic reception therein of the butt end 30 of the fishing rod proper 14. The outer surface of the base section 24 is cylindrical and the extended contour of the outer faces of the chuck fingers 26, considered collectively, is of frusto-conical configuration and corresponds in slant height and slant angle to the slant height and slant angle of the frusto-conical distal region 18 of the handle 16.

The chuck 22 is movable bodily axially within the casing 16 between a retracted position wherein the various fingers 26 release their radially directed pressure on the butt end 30 of the rod 14, and an advanced position wherein the outer arcuate surfaces of the fingers are constricted by the tapered inner surface of the frusto-conical portion 18 of the casing 16 so that they will frictionally engage the butt end 30 of the rod 14 in the usual manner of chuck application. When the fishing rod assembly is in its operative condition of use, the chuck 22 is normally urged forwardly within the casing so that it assumes its rod-engaging position under the influence of a compression spring 32 which is disposed within the tubular handle casing 16 at the proximate or rear end thereof. The spring 32 bears at one end against the end or closure cap 20. The other end of the spring 32 bears against one end of a composite thrust rod assembly which is designated in its entirety at 34 and which is comprised of two wedge parts 36 and 38, respectively, which parts, in addition to serving as a composite thrust rod assembly for transmitting the force of the spring 32 to the chuck 22, also constitute elements of the reel clamping mechanism as will be described presently.

In order to effect locking and release of the rod 14, the closure cap 20 is axially shiftable on the handle casing 16 between the retracted position wherein it is shown in dotted lines in FIG. 2 and wherein the spring 32 is extended and exerts no forward thrust on the thrust rod assembly 34, and an advanced position wherein the spring is compressed and exerts a forward thrust on the thrust rod assembly for chuck engaging purposes as described above.

The closure cap 20 includes an end wall 37 and a cylindrical wall 39, the latter being telescopically received over the rear open end of the casing 16. A pair of diametrically disposed bayonet slots 40 are formed in the casing 16 and cooperate with radially disposed pins 42 carried by the wall 39 of the closure cap 20, the pin and slot bayonet connection serving to permanently retain the closure cap on the proximate end of the casing but permitting the closure cap to assume either its retracted or its advanced position under the control of the user who may apply torque to the closure cap 20 in either direction to effect the desired manipulation.

Referring now to FIGS. 2 to 4, inclusive, wherein the reel clamping mechanism of the present invention is best illustrated, the composite thrust rod assembly 34 which, as previously stated, comprises the wedge parts 36 and 38, is operatively disposed between the chuck member 22 and spring 32. The parts 36 and 38 are each in the form of relatively deep, elongated, cup-shaped, members, the two members presenting to each other a pair of cooperating friction wedge surfaces 44 and 46, respectively. The part 38 is formed with a full cylindrical section 50 at the forward end thereof and a rear truncated cylindrical section 52, the truncation being effected by virtue of the wall which provides the wedge surface 46. A slot 54 in the wall of the part 38 cooperates with a pin 56 carried by the casing 16 in preventing turning or rotation of the part 38 with respect to the casing and also limiting the extent of rearward sliding movement of said part 38 within the casing. The forward open rim 58 of the part 38 is adapted to bear against the rear face 60 of the base portion 24 of the chuck 22.

The wedge part 36 is in the form of a truncated tubular structure of generally tapering design. The cross sectional view of this part as it appears in FIG. 4 shows that the lower regions of the part are of circular arcuate configuration, while the upper region of the part is relieved as at 62 so that it is somewhat flattened to provide a clearance region which will permit the part 36 as a whole to tilt or rock within the casing 16 between an elevated position wherein the lower outer surface 64 thereof is out of engagement with the bottom portion of the cylindrical wall of the casing and a lowered position wherein the lower surface 64 will rest on the bottom portion of the casing wall. The wall of the casing 16 is formed with an elongated longitudinally extending slot 66 therein through which slot there is adapted to be projected the oppositely extending attachment fingers or tangs 68 and 70 which constitute conventional attachment elements of the fishing reel bracket 72. When the fingers 68 and 70 are thus projected through the slot 66, they may be caused to bear against the inside face of the bottom region of the cylindrical wall of the handle casing 16 so that they will underlie the wedge part 36. Thus, when the closure member 20 is manipulated so that it assumes the advanced position in which it is shown in FIG. 2, the spring 32 will urge the part 36 forwardly against the part 38 and by virtue of the cooperating friction surfaces 44 and 46, the wedge part 36 will be rocked within the shell or casing 16 into firm clamping engagement with the two attachment fingers or tangs 68 and 70.

The forward thrust exerted by the wedge part 38 on the chuck 22 will, as previously described, yieldingly urge the chuck forwardly within the handle casing 16 and effect constriction of the chuck fingers 26 so that the butt end 30 of the fishing rod proper 14 will be securely clamped between the fingers against dislodgement.

It is obvious that movement of the closure cap 20 so as to relieve the tension of the bayonet slot connection 40, 42 will effect release of the spring pressure upon the wedge part 36 so that only a slight frictional pressure between the wedge surfaces 44 and 46 will exist. This slight frictional engagement between the parts 36 and 38 is sufficient to cause the lower regions of the part 36 to move into coextensive face-to-face contact with the lower regions of the casing 16 so that upon withdrawal of the tangs 68 and 70 from the slot 66 and removal of the reel assembly 12, the wedge part 36 will effectively close the opening afforded by the slot 66 to thus exclude the entrance of moisture, dirt or other foreign material into the casing 16.

It is thought that from the above description, the nature, operation and many advantages of the herein disclosed fishing rod handle will be readily apparent. While there have been shown, described and pointed out the fundamental novel features of the invention as applied to a preferred embodiment, it will be understood that various omissions, substitutions and changes in the form and details of the apparatus illustrated may be made by those skilled in the art without departing from the spirit of the invention. For example, while in the illustrated form of the invention, the reaction member for the forward thrust of the wedge part 38 of the reel clamping mechanism comprises the base part 24 of the rod-clamping chuck 22, it will be understood that if the rod clamping chuck is not employed, any suitable shoulder-forming means may be provided on the casing 16. If desired, the wedge part 38 may be permanently secured in a fixed position within the casing or, alternatively, the part may be dispensed with, and the inclined surface 44 caused to make camming engagement with a suitable shoulder, finger or the like provided on the casing 16. It is the intention, therefore, to be limited only by the scope of the appended claims.

Having thus described the invention what I claim as new and desire to secure by Letters Patent is:

1. In a fishing rod handle having means associated therewith for releasably clamping a fishing rod proper thereto, in combination, a generally cylindrical tubular open-ended casing having a longitudinal bore extending therethrough, the forward end of said casing presenting a slight inward taper, thus providing an internal frusto-conical surface at the extreme forward end of the bore, a chuck slidably disposed within said tubular casing and having a series of contractible and expansible chuck fingers engageable with said frusto-conical surface, said chuck being movable bodily between a retracted position wherein said fingers are out of operative engagement with said frusto-conical surface and an advanced position wherein they engage said surface and are constricted thereby for clamping engagement with the butt end of a fishing rod proper, a closure cap telescopically received over the open rear end of said casing, spring means interposed between said closure cap and chuck for normally urging said chuck forwardly in the casing, said cap being axially slidable on the casing between an extreme retracted position wherein said spring means is ineffective and an extreme advanced position wherein said spring means is effective to urge the chuck forwardly in the casing, and a pin and bayonet slot connection between the closure cap and casing, said pin and bayonet slot connection establishing the two extreme positions of the closure cap on the casing.

2. In a fishing rod handle having means associated therewith for releasably clamping a reel thereto, in combination, a generally cylindrical tubular casing having an open rear end, means defining a rearwardly facing shoulder within said casing, there being an elongated slot formed in the wall of said casing axially thereof and of a length less than the overall extent of a pair of axially aligned attachment tangs provided on a reel assembly which is to be releasably clamped to the handle, a wedge member slidably disposed within said casing and having a cam surface formed thereon and designed for camming engagement with said rearwardly facing shoulder, said wedge member being movable between a retracted position wherein it is out of effective frictional engagement with said shoulder and an advanced position wherein it frictionally engages said shoulder, said wedge member being capable of limited rocking movement within the casing into and out of clamping engagement with the tangs of the reel assembly received through said slot, a closure cap telescopically received over the open rear end of said casing and axially slidable thereon, spring means interposed between said wedge member and closure cap, said cap being movable between an extreme advanced position wherein said spring means is effective to force said wedge member forwardly in the casing against said shoulder for lateral displacement thereby against said tangs, and an extreme retracted position wherein said spring means is ineffective, and a pin and bayonet slot connection establishing the two extreme positions of the closure cap on the casing.

3. In a fishing rod handle having means associated therewith for releasably and simultaneously clamping a reel and the butt end of a fishing rod proper to the handle in respective operative positions thereon, in combination, a generally cylindrical tubular open-ended casing having a longitudinal bore extending therethrough, the forward end of said casing presenting a slight inward taper, thus providing an internal frusto-conical surface at the extreme forward end of said bore, a chuck slidably disposed within said tubular casing and having a series of contractible and expansible chuck fingers engageable with said frusto-conical surface for constricting the fingers about the butt end of a fishing rod proper, there being a longitudinal slot in said casing for reception therethrough of a pair of oppositely directed attachment tangs provided on a reel, a first wedge member slidable axially within said casing into and out of engagement with said chuck, a second wedge member slidable axially within the casing rearwardly of the first wedge member, said second wedge member being capable of limited radial displacement within the casing and being engageable with said tangs when the latter are projected through said slot, cooperating cam surfaces on said wedge members for forcing said second wedge member into clamping engagement with said tangs, a closure cap telescopically received over the open rear end of the casing and being axially slidable on the casing between a retracted and an advanced position, spring means interposed between said closure cap and the second wedge member, said spring means being effective when the closure cap is in its advanced position to effect engagement between said cam surfaces to force the second wedge member into clamping engagement with said tangs and to force said first wedge member into engagement with said chuck.

4. In a fishing rod handle, in combination, a tubular casing, a chuck slidable axially in said casing at the distal end thereof and having a series of normally open chuck fingers contractible about the butt end of a fishing rod proper for retaining the rod in position on the handle, cooperating cam surfaces on said casing and each of said chuck fingers for causing contraction of the fingers upon forward movement of the chuck within the casing, a first wedge member slidable axially in the casing into and out of engagement with the chuck, a second wedge member slidable axially within the casing rearwardly of the first wedge member into and out of engagement with the first wedge member, an actuating member slidable axially on the casing rearwardly of the second wedge member between rear retracted and forward advanced positions respectively, a spring interposed between said actuating member and second wedge member and operable between the actuating member and second wedge member to urge the latter forwardly into engagement with said chuck, said second wedge member being capable of limited rocking movement within the casing laterally toward and away from an internal surface of the casing, and cooperating cam surfaces on said wedge members engageable with each other when the second wedge member is forced against the first wedge member for effecting lateral displacement of the second wedge member whereby an object such as the attachment tang of a reel attachment interposed between said internal surface and second wedge member will be clamped between the surface and wedge member.

5. In a fishing rod handle, the combination set forth in claim 4 including, additionally, means preventing relative rotational movement between said first wedge member and casing.

6. In a fishing rod handle, the combination set forth in claim 4 wherein said first and second wedge members are each in the form of tubular members which are truncated to provide a pair of cooperating planar cam surfaces of small slant angle relative to the respective longitudinal axes of the wedge members.

7. In a fishing rod handle, the combination set forth in claim 4 wherein said actuating member comprises a cap mounted on the rear open end of the casing to slide lengthwise of said casing, and a pin and bayonet slot connection between said cap and casing limiting the extent of sliding movement of the cap on the casing, said pin and bayonet slot connection establishing the forward advanced and rear retracted positions of the cap.

8. In a fishing rod handle, the combination set forth in claim 4 wherein said chuck is of integral construction and is formed of resilient spring material with the chuck fingers thereof being inherently maintained in their normally open positions.

9. In a fishing rod handle, releasable clamping means at the distal end of the handle for removably securing the butt end of a fishing rod proper in operative position on the handle, releasable clamping means intermediate the proximate and distal ends respectively of the handle for removably securing the attachment tangs of a reel assembly in operative position on the handle, a spring common to said clamping means for biasing the same, a single operating member mounted on the handle for movement in opposite directions and common to both of said releasable clamping means for simultaneously actuating the same, and means including said spring operatively connecting said member and each of said releasable clamping means for rendering the same simultaneously effective when said member is moved in one direction and for rendering the same ineffective when said member is moved in the other direction.

10. In a fishing rod handle, releasable contractible and expansible clamping means at the distal end of the handle for removably securing the butt end of a fishing rod proper in operative position on the handle, releasable clamping means, intermediate the proximate and distal ends respectively of the handle for applying radial pressure to the attachment tangs of a reel assembly to removably clamp the same against a surface on the handle, a cap member on the proximate end of the handle and shiftable in opposite directions between two extreme positions, and means operatively connecting said cap member and each of said releasable clamping means for simultaneously rendering the same effective when the cap member is in one of said extreme positions and for simultaneously rendering the same ineffective when the cap member is in the other of said extreme positions.

11. In a fishing rod handle, releasable clamping means at the distal end of a fishing rod handle for removably securing the butt end of a fishing rod proper in operative position on the handle, releasable clamping means intermediate the proximate and distal ends respectively of the handle for removably securing the attachment tangs of a reel assembly in operative position on the handle, an element of the tang-securing clamping means being engageable with an element of the rod-securing clamping means for effecting engagement and release of the latter clamping means upon engagement and release respectively of the former clamping means, and an operating member movably mounted on the handle for actuating said tang securing clamping means.

References Cited in the file of this patent

UNITED STATES PATENTS

| | | |
|---|---|---|
| 1,159,466 | Bristow | Nov. 9, 1915 |
| 2,056,963 | Fuchs et al. | Oct. 13, 1936 |
| 2,782,547 | McMullin | Feb. 26, 1957 |
| 2,793,458 | Stephens | May 28, 1957 |